(12) United States Patent
Fleouter et al.

(10) Patent No.: US 8,380,034 B2
(45) Date of Patent: Feb. 19, 2013

(54) SPLICE HOLDER DEVICE USING DOWNWARDLY-EXTENDING ARMS

(75) Inventors: Patrick Fleouter, Pontchateau (FR); Samuel Prou, Nantes (FR)

(73) Assignee: 3M Innovative Properties Company, St. Paul, MN (US)

(*) Notice: Subject to any disclaimer, the term of this patent is extended or adjusted under 35 U.S.C. 154(b) by 431 days.

(21) Appl. No.: 12/445,647

(22) PCT Filed: Oct. 4, 2007

(86) PCT No.: PCT/US2007/080418
§ 371 (c)(1),
(2), (4) Date: Aug. 24, 2010

(87) PCT Pub. No.: WO2008/048791
PCT Pub. Date: Apr. 24, 2008

(65) Prior Publication Data
US 2010/0303430 A1    Dec. 2, 2010

Related U.S. Application Data

(60) Provisional application No. 60/829,575, filed on Oct. 16, 2006.

(51) Int. Cl.
*G02B 6/54* (2006.01)
(52) U.S. Cl. .................................................. 385/135
(58) Field of Classification Search ............ 385/135
See application file for complete search history.

(56) References Cited

U.S. PATENT DOCUMENTS

| | | | |
|---|---|---|---|
| 5,074,635 A * | 12/1991 | Justice et al. | 385/95 |
| 5,208,893 A | 5/1993 | McCall et al. | |
| 5,222,184 A * | 6/1993 | Foss | 385/135 |
| 5,515,472 A | 5/1996 | Mullaney et al. | |
| 5,870,519 A | 2/1999 | Jenkins et al. | |
| 6,249,635 B1 * | 6/2001 | Daoud | 385/137 |
| 6,259,851 B1 | 7/2001 | Daoud | |
| 6,285,815 B1 | 9/2001 | Daoud | |
| 6,801,704 B1 | 10/2004 | Daoud et al. | |
| 6,810,193 B1 * | 10/2004 | Muller | 385/135 |
| 2003/0091316 A1 * | 5/2003 | Wu et al. | 385/137 |
| 2004/0062508 A1 | 4/2004 | Blankenship et al. | |
| 2004/0240825 A1 * | 12/2004 | Daoud et al. | 385/135 |
| 2006/0215980 A1 * | 9/2006 | Bayazit et al. | 385/135 |

FOREIGN PATENT DOCUMENTS

AU          751741          3/2000

* cited by examiner

*Primary Examiner* — Mark Robinson
*Assistant Examiner* — Andrew Jordan
(74) *Attorney, Agent, or Firm* — Janet A. Kling

(57) ABSTRACT

A splice tray (100) to hold a splice holder device (180) configured hold both a mechanical splice and a fusion splice, each having a different shape. A splice holder device (180) includes a first splice channel and second splice channel. Each splice channel includes one or more flexible arms spaced along a length of the splice channel to provide a resistance against a housing of the splice. Also, each channel includes one or more base supports and one or more upper stops. The flexible arms extend from a channel wall at an angle to provide force components in orthogonal directions.

8 Claims, 4 Drawing Sheets

SPLICE HOLDER DEVICE USING DOWNWARDLY-EXTENDING ARMS

CROSS-REFERENCE TO RELATED APPLICATION

This application is a national stage filing under 35 U.S.C. 371 of PCT/US2007/080418, filed Oct. 4, 2007, which claims the benefit of U.S. Provisional Patent Application No. 60/829,575, filed Oct. 16, 2006, the disclosure of which is incorporated by reference herein in its entirety.

THE FIELD OF THE INVENTION

The present invention relates generally to a splice holder device for telecommunications.

BACKGROUND OF THE INVENTION

Telecommunication cables are used for distributing all manner of data across vast networks. A telecommunication cable typically includes a bundle of individual telecommunication lines (either optical fibers or copper wires) that are encased within a protective sheath. As telecommunication cables are routed across data networks, it is necessary to periodically open the cable so that one or more telecommunication lines therein may be spliced, thereby allowing data to be distributed to other cables or "branches" of the telecommunication network. The cable branches may be further distributed until the network reaches individual homes, businesses, offices, premises, and so on.

At each point where a telecommunication cable is opened, some type of enclosure is provided to protect the exposed interior of the cable. Commonly, the enclosure has one or more ports through which cables enter and/or exit the enclosure. Once inside the enclosure, the cable is opened to expose the telecommunication lines therein. Conventional telecommunication enclosures are constructed to facilitate the management and protection of individual telecommunication lines and splices thereof.

For optical fiber communications lines, there are several different types of conventional splices being utilized, namely fusion splices and a variety of mechanical splices. Each type of splice offers it own sets of advantages and disadvantages.

SUMMARY

In one aspect, an embodiment of the invention described herein provides a splice tray having a splice holder device configured to support two or more different types of fiber splices. For example, the same splice tray can hold both a mechanical splice and a fusion splice, each having a different shape.

In one aspect, a splice holder device includes a first splice channel and a second splice channel. Each splice channel includes one or more flexible arms spaced along a length of the splice channel to provide a resistance against a housing of an individual splice. Also, each channel includes one or more base supports and one or more upper stops. In a preferred aspect, the flexible arms extend from a channel wall at an angle to provide force components in orthogonal directions. In another aspect, each flexible arm further includes a lip or ridge structure for further support of a splice body engaging the flexible arm.

In another aspect, the splice tray is mountable in a telecommunications enclosure, such as a Network Interface Device (NID).

In a further aspect, the mechanical or fusion splice can be of a single fiber or of a mass or ribbon fiber.

In a further aspect, the splicing holder device is formed as an integral portion of the splice tray.

In an alternative aspect, the splice holder device is formed as an insert that can be disposed in a cutout portion of the splice tray.

In another aspect, the splice holder device hold or secure one or more of 1×N fiber optic splitters, 2×N fiber optic splitters, WDM components, CWDM components, switches, multiplexers, triplexers, duplexers, detectors, mirrors, lasers, amplifiers, or combinations thereof.

The above summary of the present invention is not intended to describe each illustrated embodiment or every implementation of the present invention. The figures and the detailed description that follows more particularly exemplify these embodiments.

BRIEF DESCRIPTION OF THE DRAWINGS

Embodiments of the invention are better understood with reference to the following drawings. The elements of the drawings are not necessarily to scale relative to each other.

DESCRIPTION OF THE EMBODIMENTS

In the following detailed description of the preferred embodiments, reference is made to the accompanying drawings, which form a part hereof, and in which is shown by way of illustration specific embodiments in which the invention may be practiced. The illustrated embodiments are not intended to be exhaustive of all embodiments according to the invention. It is to be understood that other embodiments may be utilized and structural or logical changes may be made without departing from the scope of the present invention. The following detailed description, therefore, is not to be taken in a limiting sense.

The present invention is directed to a splice holder device configured to hold different sized and shaped conventional splices, including fusion splices and mechanical splices, and passive and/or active optical components. In contrast, conventional splice trays often use splice holders that are not capable of holding more than one size or shape of splice.

Figure 1A:
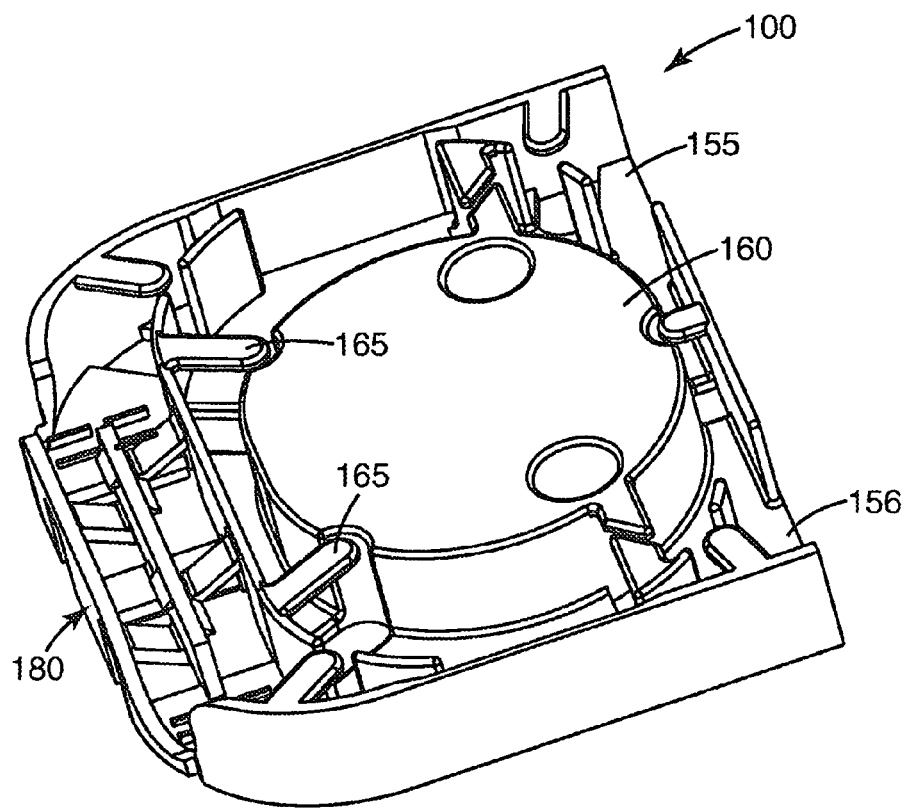
FIG. 1A is an isometric view of a splice tray having a splice holder device according to an aspect of the present invention.

FIG. 1A shows a preferred aspect of the present invention, a splice tray 100, which includes a splice holder device 180 configured to hold and secure different types of splices simultaneously. Splice tray 100 provides a platform and small storage area so that, e.g., a distribution cable fiber can be connected to a drop cable fiber, or other cable fiber, to distribute a telecommunications signal in an intended manner. Generally, the fibers mentioned herein can be standard optical telecommunications fibers.

As shown in FIG. 1A, splice tray 100 can be formed as a generally rectangular structure. Although the term "splice tray" is used throughout, as is described in more detail below, in alternative aspects, tray 100, and holder 180, can hold passive and/or active optical components, as well as, or instead of, splices.

Splice tray 100 includes a latching mechanism that provides a straightforward coupling of the splice tray 100 to a housing, closure or enclosure in which it resides (e.g., an aerial closure, terminal, pedestal, NID, etc.). In a preferred aspect, several posts (not shown) extending from a backside of tray 100 can engage in a snug fit with corresponding receptacles in the housing, closure or enclosure. Alternatively, conventional fasteners (screws, bolts, etc.) can be utilized. In a further alternative embodiment, the latching mechanism can include a coupling portion, such as a rod or hook structure that engages a mating part on a splice tray frame or the housing, closure or enclosure that allows tray 100 to be mounted via a rotating coupling.

In a preferred aspect, splice tray 100 can be installed in a Network Interface Device (NID) located at a premises, such as the outside wall of a house. Alternatively, splice tray 100 can be implemented in a cabinet environment.

Splice tray 100 further includes fiber entrance and exit channels 155, 156. In a preferred aspect, splice tray 100 is configured to secure the splices from at least one outdoor drop line to at least one indoor drop line.

In one aspect, fiber from the distribution cable/drop cable is received in fiber entrance/exit channels 155, 156 and then routed to a splice holder 180. The splice holder 180 is configured to support mechanical and fusion splices made between two or more optical fibers, as well as passive and/or active components.

The various components of the splice tray 100 can be formed of any suitable material. The materials are selected depending upon the intended application and may include both polymers and metals. In one embodiment, the splice tray is formed of polymeric materials by methods such as injection molding, extrusion, casting, machining, and the like. Alternatively, components may be formed of metal by methods such as molding, casting, stamping, machining and the like. Material selection will depend upon factors including, but not limited to, chemical exposure conditions, environmental exposure conditions including temperature and humidity conditions, flame-retardancy requirements, material strength, and rigidity, to name a few.

Figure 1B:
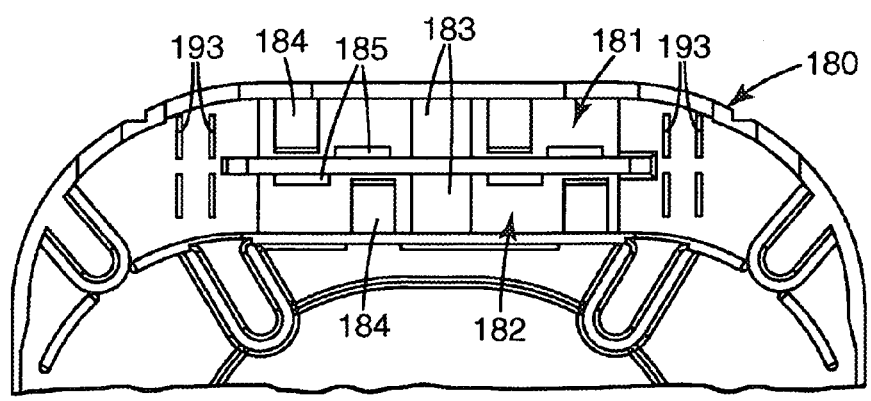
FIG. 1B is a close-up view of the splice holder device portion of the splice tray of FIG. 1A.

As shown in FIG. 1B, splice holder 180 includes first splice channel 181 and second splice channel 182. Thus, in one preferred aspect, splice channel 181 can secure a mechanical splice and splice channel 182 can secure a fusion splice, or vice versa. Although only two separate channels are shown for this embodiment, a splice holder 180 may be configured to include more splice channels, to secure, e.g., three splices, four splices, or more splices, as would be apparent to one of ordinary skill in the art given the present description.

Each channel 181, 182 includes one or more flexible arms, such as spring arms 184. In a preferred aspect, each channel includes a plurality of flexible arms spaced along the length of the splice channel. The flexible arms are configured to provide a resistance against a splice housing or similar structure (see e.g., FIG. 2). Also, each channel 181, 182 can include one or more channel bases or lower supports 183 and one or more upper stops 185. In a preferred aspect, lower supports 183 can extend the entire width of the splice channels, while upper stops 185 extend to only a portion of the width of the splice channel. In a further alternative, the channel base for each splice channel can extend the entire width and length of the splice channel. In a further aspect, each channel 181, 182 can further include channel end members 193 that provide a visual reference to the user in centering a splice in the channel.

Figure 2:
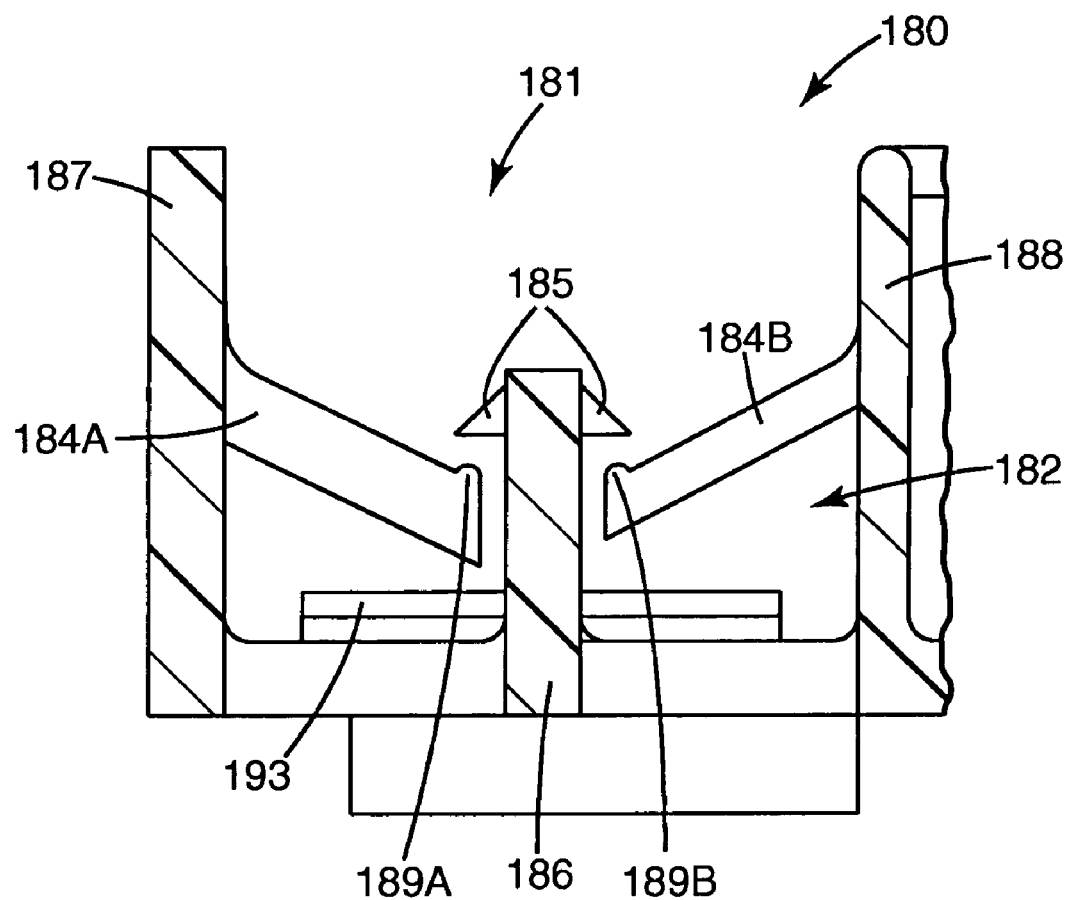
FIG. 2 is a cross-section view of a splice holder device according to an aspect of the present invention.

As shown in more detail in cross section view in FIG. 2, flexible arms 184A of channel 181 and flexible arms 184B of channel 182 can extend from a channel wall (in this embodiment, arm 184A extends from outer channel wall 187 and flexible arms 184B extend from channel wall 188). In addition, the flexible arms extend downward (as oriented in the Figs.) and at a non-90° angle, and each of the arms extends into their respective splice channel by a substantial amount of the entire width of the splice channel. In addition, each flexible arm can further include a small lip or ridge 189A, 189B, formed at an end portion of the flexible arm, to provide an additional supporting structure. In a preferred aspect, the one or more upper stops 185 can be formed on an opposite channel wall from the flexible arms (in this embodiment, stops 185 are formed on both sides of center wall 186).

Figure 3A:
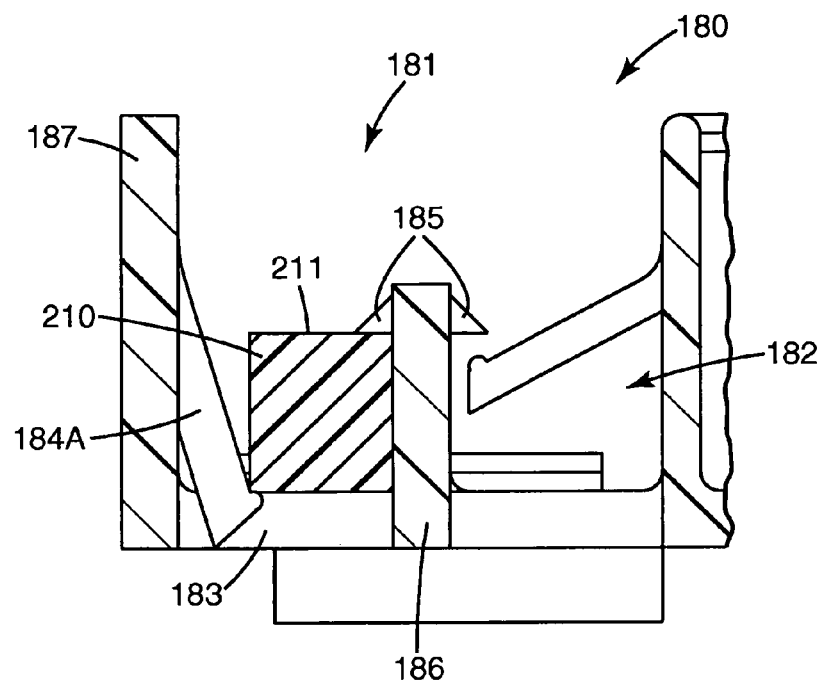
FIG. 3A is a cross-section view of a splice holder device holding a mechanical splice according to an aspect of the present invention.

FIG. 3A shows a cross-section view of an exemplary splice holder device 180 holding a conventional mechanical splice 210. In this aspect, mechanical splice 210 is disposed in splicing channel 181. Simultaneously, a second mechanical splice, or a fusion splice, could be disposed in channel 182, but is not shown for simplicity.

Figure 3B:
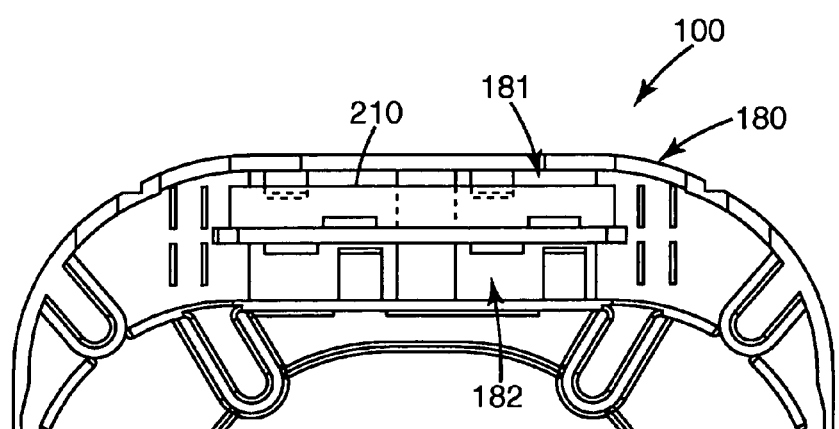
FIG. 3B is a top view of a splice tray having the splice holder device and mechanical splice of FIG. 3A.

Mechanical splice 210 has a generally rectangular shape in cross-section. To install, mechanical splice 210 is pressed downward into splice channel 181 until a top surface 211 engages one or more of the upper stops 185. As the mechanical splice 210 is pressed downward, the flexible arms 184A, which are pressed downward and towards the outer channel wall 187, exert a force against the mechanical splice 210 in both a first (horizontal) direction towards the center wall 186 and a second (vertical, orthogonal) direction towards upper stops 185. Thus, normal force pressure exerted by the upper stop and the opposite channel wall can secure the splice 210 in place in the splice channel. Alternatively, a portion of the mechanical splice 210 can be supported by lower support 183. FIG. 3B shows a top view of mechanical splice 210 secured in splice channel 181 of splice holder device 180.

Figure 4A:
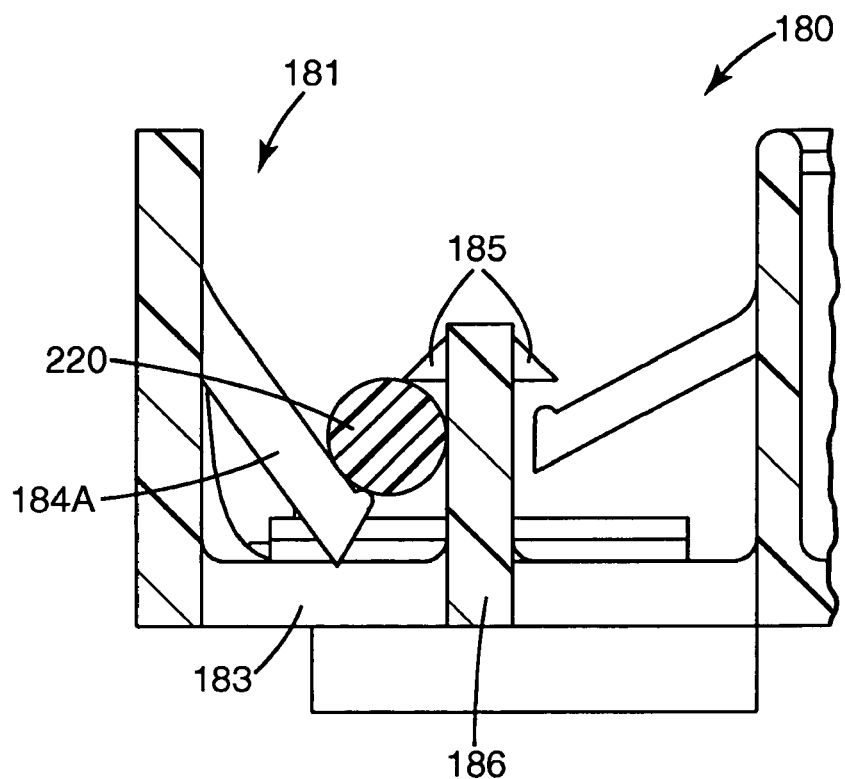
FIG. 4A is a cross-section view of a splice holder device holding a fusion splice according to an aspect of the present invention.
Figure 4B:
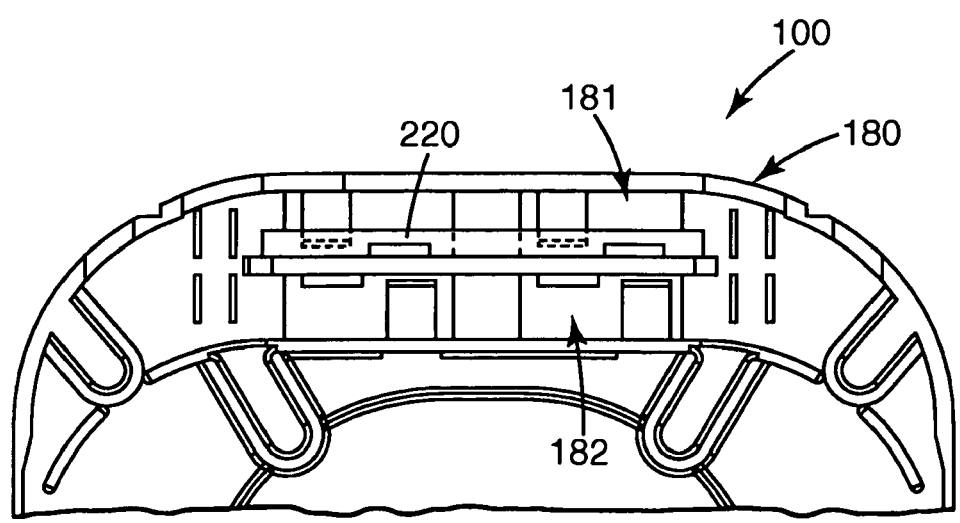
FIG. 4B is a top view of a splice tray having the splice holder device and fusion splice of FIG. 4A.

In another embodiment, FIG. 4A shows a cross-section view of an exemplary splice holder device 180 holding a conventional fusion splice 220. In this aspect, fusion splice 220 is disposed in splicing channel 181. Fusion splice 220 has a generally circular shape in cross-section. To install, fusion splice 220 is pressed downward into splice channel 181 until a portion of its outer surface engages upper stops 185. As the fusion splice 220 is pressed downward, the flexible arms 184A, which are pressed downward and towards the outer channel wall 187, exert a force against the fusion splice 220 in both a (horizontal) direction towards the center wall 186 and a (vertical) direction towards upper stops 185. FIG. 4B shows a top view of fusion splice 220 secured in splice channel 181 of splice holder device 180.

The mechanical or fusion splices held by the splice holder can be of any conventional shape or size. In one aspect, splice holder device 180 can be configured to receive and secure a conventional 4×4 FIBRLOK™ splices (commercially available from 3M Company, St. Paul Minn.) and a conventional fusion splice, such as a RecordSplice, available from Tyco Corp., Princeton, N.J. In one preferred aspect, the splice holder device 180 can receive and secure splices having dimensional properties that fall within the following ranges—length (35 mm to 50 mm), height (2.5 mm to 7 mm), and width (2.5 mm to 7 mm). Of course, these dimensions are illustrative only of one embodiment, as the dimensional aspects of the splice channels can be modified to accommodate different sizes of splices without departing from the scope of the invention, as would be apparent to one of skill in the art given the present description.

Also, the mechanical or fusion splices held by the splice holder of the embodiments herein can be of a single-fiber or of a mass or ribbon fiber splice.

In a preferred aspect, the splice holder device 180 can be formed as an integral portion of tray 100. Alternatively, tray 100 can be formed with a cutout at the splicing area so that a splice holder insert can be mounted to the tray 100.

Referring back to FIG. 1A, entering/exiting fibers are typically routed to/from the splicing area via a fiber routing structure 160 that allows for some slack storage without bending the fiber beyond its minimum bend radius. Further fiber guiding structures, such as tabs 165, can be formed in splice tray 100 to route, support, and secure the fiber(s) being spliced.

In an alternative aspect, splice holder device 100 can be configured to hold or secure any number of different passive and/or active optical components. For example, holder 180 can be configured to hold or secure one or more of 1×N fiber optic splitters, 2×N fiber optic splitters, WDM components, CWDM components, switches, multiplexers, triplexers, duplexers, detectors, mirrors, lasers, amplifiers, or combinations thereof.

Although not shown, splice tray 100 can further include a removable cover, such as a plastic, preferably transparent cover.

Although specific embodiments have been illustrated and described herein for purposes of description of the preferred embodiment, it will be appreciated by those of ordinary skill in the art that a wide variety of alternate or equivalent implementations may be substituted for the specific embodiments shown and described without departing from the scope of the present invention. Those with skill in the art will readily appreciate that the present invention may be implemented in a very wide variety of embodiments. This application is intended to cover any adaptations or variations of the embodiments discussed herein.

We claim:

1. A splice tray, comprising:
an integral splice holder device configured to support two or more different types of fiber splices, wherein the splice holder device includes a first splice channel and a second splice channel wherein each splice channel includes one or more flexible arms spaced along a length of each splice channel to provide a resistance against an individual fiber splice and wherein each channel includes one or more base supports and one or more upper stops, wherein the flexible arms extend downward from a channel wall at an angle to provide a force to hold the fiber splice between the one or more upper stops and the flexible arms and wherein each splice channel is capable of holding either a mechanical splice or a fusion splice.

2. The splice tray of claim 1, wherein, each flexible arm further comprises a lip or ridge structure for further support of the fiber splice when engaging with the flexible arms.

3. The splice tray of claim 1, wherein the fiber splice is one of a single fiber splice, a mass fiber splice and a ribbon fiber splice.

4. The splice tray of claim 1, wherein the splice holder device is configured to support at least one mechanical splice and at least one fusion splice.

5. The splice tray of claim 1, wherein the splice holder configured to support at least one of a 1×N fiber optic splitters, a 2×N fiber optic splitters, a WDM components, a CWDM components, and combinations thereof.

6. The splice tray of claim 5, wherein the telecommunications enclosure is a network interface device.

7. The splice tray of claim 1, wherein the splice tray is mountable in a telecommunications enclosure.

8. The splice tray of claim 1, wherein the flexible arms exert a force against the splice in both a horizontal direction towards a center wall and a vertical direction towards upper stops.

* * * * *